W. H. SWARTOUT & G. W. HARTLEY.
Cultivator and Corn Planter.

No. 211,871.  Patented Feb. 4, 1879.

WITNESSES
Saml R. Turner
P. H. Lacey.

INVENTOR
William H. Swartout
George W. Hartley
By their Attorneys
R. S. & A. Lacey

UNITED STATES PATENT OFFICE.

WILLIAM H. SWARTOUT AND GEORGE W. HARTLEY, OF SALINEVILLE, OHIO.

IMPROVEMENT IN CULTIVATOR AND CORN-PLANTER.

Specification forming part of Letters Patent No. 211,871, dated February 4, 1879; application filed November 11, 1878.

*To all whom it may concern:*

Be it known that we, WILLIAM H. SWARTOUT and GEORGE W. HARTLEY, of Salineville, in the county of Columbiana and State of Ohio, have invented certain new and useful Improvements in Cultivator and Corn-Planter; and we do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish a planter and cultivator in which the driving or crank wheel may be at all times held firm to the ground and to its work, and not be rendered ineffective by the vibrations or rocking movement, lateral or longitudinal, of the planter.

It consists in a spring-bearing capable of a vertical and a lateral adjustment, in which the crank-wheel is supported, and in other devices, all of which will be hereinafter explained.

Figure 1:
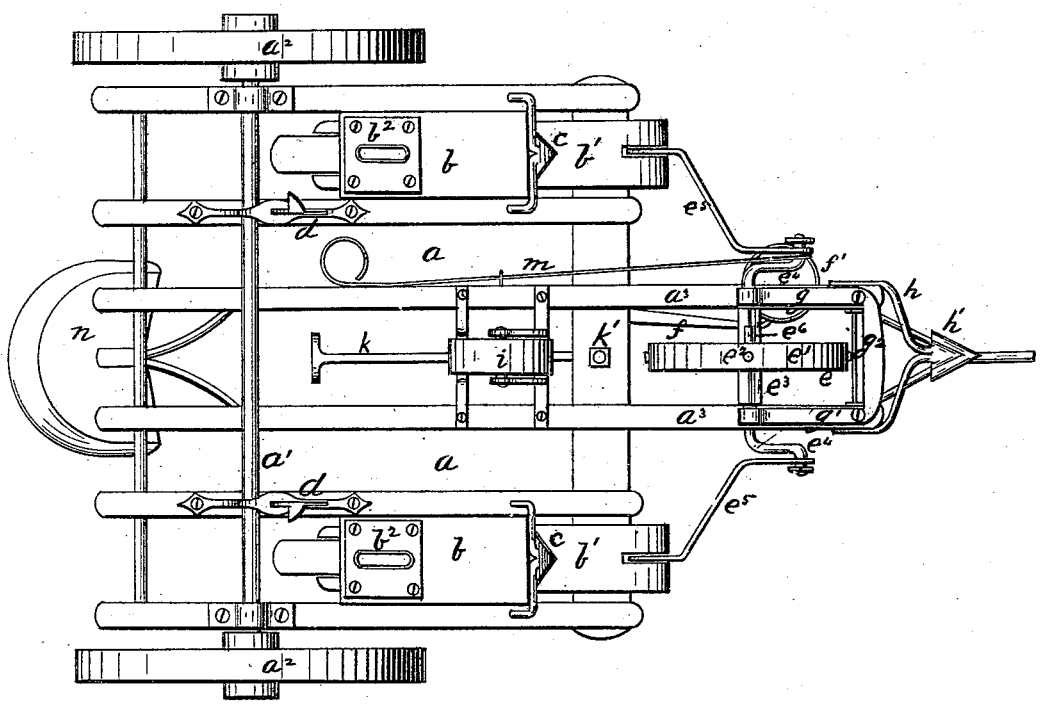
Figure 2:
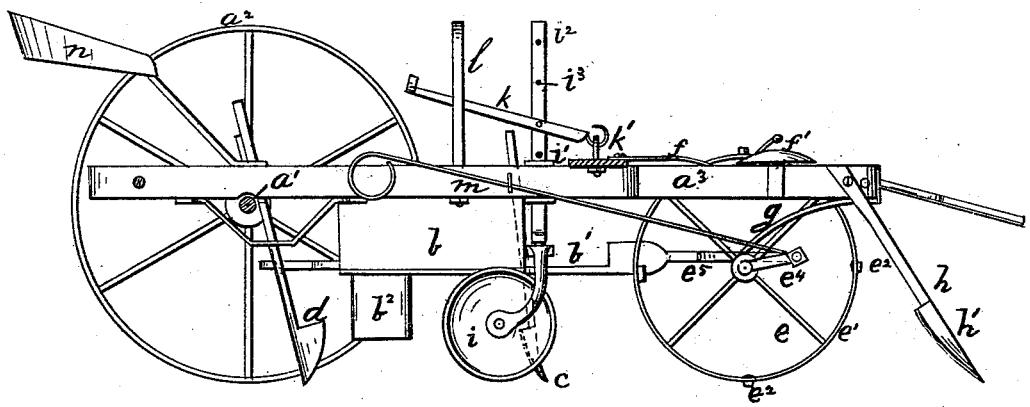

In the drawings, Figure 1 is an under-side view, and Fig. 2 a longitudinal vertical section, of a planter and cultivator constructed according to our invention.

$a$ is the planter-frame, supported on the axle $a^1$ and wheels $a^2$. $b\ b$ are the grain-boxes, provided with the slides or dropping-bars $b^1\ b^1$, arranged to operate longitudinally or parallel to the line of motion of the planter. Arranged immediately in front of the grain-boxes $b$ are the furrow-openers $c\ c$, and immediately in rear and to one side of the boxes $b$ are placed the coverers $d\ d$. By this arrangement the furrow will be opened by the openers $c$, and the grain dropped from the openings $b^2\ b^2$ in the boxes $b$ will be covered by the shovels or coverers $d$.

$e$ is the crank or driving wheel, the rim $e^1$ of which rests on the ground, and is provided with suitable projections $e^2$, which hold it in place and prevent its slipping, and it is supported on the axle $e^3$, the outer ends of which are bent into the cranks $e^4$, to which are attached the pitman-rods $e^5$, which connect with and give motion to the slide-bars $b^1\ b^1$. The wheel $e$ is also provided with a side projection, $e^6$, arranged to actuate a spring-hammer, $f$, which strikes the bell $f'$ and indicates the dropping of the grain.

The axle $e^3$ is supported in bearings on the rear ends of spring or elastic arms $g\ g^1$, arranged on opposite sides of the wheel $e$, the forward ends of which arms are attached to the projecting ends of the bars $a^3\ a^3$ of the frame $a$. For strength and convenience the forward ends of these springs $g\ g^1$ are united together by the cross-bar $g^2$, making a stirrup-shaped device, as shown in Fig. 1. These elastic arms $g\ g^1$ permit of any necessary degree of vertical movement of the wheel $e$, to adapt the latter to inequalities or obstructions in the ground without interfering with the regular working of the slide-bars $b^1$, and they also permit of the elevation or depression of one bearing above or below the other, thus preserving the wheel in its normal position when the planter-frame is subjected to a lateral rocking movement by reason of one or the other of the wheels $a^2$ passing over obstructions. It will be seen that the wheel $e$ is thus held firmly with its rim flat on the ground at all times, no difference what may be the inequalities in the surface of the ground.

$h$ is a track-cleaner and steadying-arm, arranged immediately in front of the wheel $e$. It is provided with a point or shovel, $h'$, and is affixed to the frame $a$ with capability of adjustment, so that it can be set to open a slight furrow for the rim of the wheel $e$, or so that it will only remove trash and clods from the surface of the ground. It also serves to hold the forward end of the frame $a$ steadily in the line of motion, thus relieving the wheel $e$ from all strain.

$i$ is an adjustable caster-wheel, held in place on the frame $a$ in a bearing, $i^1$, arranged immediately in rear of the wheel $e$. Its shank or arm $i^2$ is provided with a series of holes, $i^3$, so that it may be supported higher or lower on the operating-lever $k$, which is fulcrumed to the frame $a$ at $k'$, as shown. The lever $k$ is provided with a suitable pawl or lip, which engages in a ratchet in the bar $l$.

When desired the wheel $e$ may be lifted clear of the ground by depressing the lever $k$, thereby forcing the caster-wheel down so that it will support the forward end of the frame $a$. The wheel $i$ is often necessary to steady the movements of the planter. By forcing it down so that it will press on the ground, (but not with sufficient force to lift the wheel $e$,) or by letting it rest loosely in its bearings $i^1$, so that it falls or rises with the fall or rise of the forward end of the planter, it will prevent any lateral unsteady movements of the frame, which would otherwise interfere with the regularity of the dropping of the grain.

$m$ is a rod attached to one of the cranks $e^4$, and carried back near to the seat $n$. The object of this rod is to give facilities for continuing the operation of dropping when from any cause it is desired to lift the wheel $e$ clear of the ground. The operator can turn the wheel $e$ by the aid of the rod $m$.

Having thus described our invention, what we claim, and desire to secure by Letters Patent, is—

The combination, with the frame $a$ and the wheel $e$, supported in spring-bearings $g$ $g^1$, with capability of a vertical and lateral rocking movement, of the track-cleaner and steadying-arm $h$, having the point or shovel $h^1$, and secured to the frame $a$, with capability of adjustment immediately in front of the wheel $e$, and the caster-wheel $i$, having the arm $i^2$ held loosely in a bearing, $i^1$, immediately in rear of the wheel $e$, all arranged to operate substantially as and for the purposes set forth.

In testimony that we claim the foregoing as our own we affix our signatures in presence of two witnesses.

WILLIAM H. SWARTOUT.
GEORGE W. HARTLEY.

Witnesses:
JAMES G. MOORE,
W. W. PUMPHREY.